(12) United States Patent
Lawrence et al.

(10) Patent No.: US 11,307,562 B2
(45) Date of Patent: Apr. 19, 2022

(54) APPLICATION OF SIMPLE RANDOM SEARCH APPROACH FOR REINFORCEMENT LEARNING TO CONTROLLER TUNING PARAMETERS

(71) Applicant: Honeywell International Inc., Morris Plains, NJ (US)

(72) Inventors: Nathan Lawrence, North Vancouver (CA); Philip D. Loewen, North Vancouver (CA); Bhushan Gopaluni, Vancouver (CA); Gregory E. Stewart, North Vancouver (CA)

(73) Assignee: Honeywell International Inc., Charlotte, NC (US)

( * ) Notice: Subject to any disclaimer, the term of this patent is extended or adjusted under 35 U.S.C. 154(b) by 212 days.

(21) Appl. No.: 16/673,908

(22) Filed: Nov. 4, 2019

(65) Prior Publication Data

US 2021/0132587 A1    May 6, 2021

(51) Int. Cl.
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/42018* (2013.01)

(58) Field of Classification Search
CPC ...... G05B 19/4155; G05B 2219/42018; G06N 20/00
USPC .................................................. 700/44–53
See application file for complete search history.

(56) References Cited

U.S. PATENT DOCUMENTS

| | | | |
|---|---|---|---|
| 6,917,925 B2 | 6/2005 | Berenji et al. | |
| 8,301,275 B2 * | 10/2012 | Tondolo | G05B 13/024 700/42 |
| 8,429,096 B1 | 4/2013 | Soundararajan et al. | |
| 8,429,097 B1 | 4/2013 | Sivasubramanian et al. | |
| 9,349,092 B2 * | 5/2016 | Thibeault | G06N 20/00 |
| 9,754,221 B1 | 9/2017 | Nagaraja | |
| 9,971,318 B2 * | 5/2018 | He | G05B 13/047 |
| 10,152,033 B2 | 12/2018 | LoPiccolo et al. | |
| 10,274,977 B2 | 4/2019 | North et al. | |
| 10,358,771 B2 | 6/2019 | He et al. | |
| 10,429,800 B2 | 10/2019 | Forbes | |

(Continued)

OTHER PUBLICATIONS

Park, Daewon, et al. "Multicopter PID Attitude Controller Gain Auto-tuning through Reinforcement Learning Neural Networks." Proceedings of the 2019 2nd International Conference on Control and Robot Technology. 2019.pp. 80-84 (Year: 2019).*

(Continued)

*Primary Examiner* — Satish Rampuria
(74) *Attorney, Agent, or Firm* — Ortiz & Lopez, PLLC; Luis M. Ortiz; Kermit D. Lopez (57) ABSTRACT

A method and system for reinforcement learning can involve applying a finite-difference approach to a controller, and tuning the controller in response to applying the finite-difference approach by taking a state as an entirety of a closed-loop step response. The disclosed finite-different approach is based on a random search to tuning the controller, which operates on the entire closed-loop step-response of the system and iteratively improves the gains towards a desired closed-loop response. This allows for prescribing stability requirement into the reward function without any modeling procedures.

20 Claims, 7 Drawing Sheets

(56) References Cited

U.S. PATENT DOCUMENTS

| | | | |
|---|---|---|---|
| 10,445,641 B2 | 10/2019 | Srinivasan et al. | |
| 2002/0040250 A1* | 4/2002 | Gaikwad | G05B 11/42 700/37 |
| 2017/0220007 A1* | 8/2017 | LoPiccolo | B25J 9/1628 |
| 2019/0042761 A1 | 2/2019 | Wang et al. | |
| 2019/0187631 A1 | 6/2019 | Badgwell et al. | |

OTHER PUBLICATIONS

Dai, Xiaohui, Chi-Kwong Li, and Ahmad B. Rad. "An approach to tune fuzzy controllers based on reinforcement learning for autonomous vehicle control." IEEE Transactions on Intelligent Transportation Systems 6.3 (2005): pp. 285-293. (Year: 2005).*

Kashki, Mohammad, Youssef Lotfy Abdel-Magid, and Mohammad Ali Abido. "A reinforcement learning automata optimization approach for optimum tuning of PID controller in AVR system." International Conference on Intelligent Computing. Springer, Berlin, Heidelberg, 2008.pp. 684-692 (Year: 2008).*

Spielberg, S. P. K., R. B. Gopaluni, and P. D. Loewen. "Deep reinforcement learning approaches for process control." 2017 6th international symposium on advanced control of industrial processes (AdCONIP). IEEE, 2017. pp. 201-206 (Year: 2017).*

Luo, Jianlan, et al. "Reinforcement learning on variable impedance controller for high-precision robotic assembly." 2019 International Conference on Robotics and Automation (ICRA). IEEE, 2019. pp. 3080-3087 (Year: 2019).*

Johannink, Tobias, et al. "Residual reinforcement learning for robot control." 2019 International Conference on Robotics and Automation (ICRA). IEEE, 2019. pp. 6023-6029 (Year: 2019).*

Åström, K. J., & Hägglund, T. (1984). Automatic tuning of simple regulators with specifications on phase and amplitude margins. Automatica, 20(5), 645-651.

Badgwell, T. A., Lee, J. H., & Liu, K. H. (2018). Reinforcement Learning—Overview of Recent Progress and Implications for Process Control. In Computer Aided Chemical Engineering (vol. 44, pp. 71-85). Elsevier.

Berger, M. A., & da Fonseca Neto, J. V. (2013). Neurodynamic Programming Approach for the PID Controller Adaptation. IFAC Proceedings Volumes, 46(11), 534-539.

Berner, J., & Soltesz, K. (Sep. 2017) Short and robust experiments in relay autotuners. In 2017 22nd IEEE International Conference on Emerging Technologies and Factory Automation (ETFA) (pp. 1-8). IEEE.

Bhatnagar, S., Ghavamzadeh, M., Lee, M., & Sutton, R. S. (2008). Incremental natural actor-critic algorithms. In Advances in neural information processing systems (pp. 105-112).

Brujeni, L. A., Lee, J. M., & Shah, S. L. (2010). Dynamic tuning of PI-controllers based on model-free reinforcement learning methods (pp. 453-458). IEEE.

Degris, T., White, M., & Sutton, R. S. (2012). Off-policy actor-critic. arXiv preprint arXiv:1205.4839.

Galeani, S., Tarbouriech, S., Turner, M., & Zaccarian, L. (2009). A tutorial on modern anti-windup design. European Journal of Control, 15(3-4), 418-440.

Hägglund, T., & Åström, K. J. (2002). Revisiting the Ziegler-Nichols tuning rules for PI control. Asian Journal of Control, 4(4), 364-380.

Hast, M., Åström, K. J., Bernhardsson, B., & Boyd, S. (Jul. 2013). PID design by convex-concave optimization. In 2013 European Control Conference (ECC) (pp. 4460-4465). IEEE.

Kaisare, N. S., Lee, J. M., & Lee, J. H. (2003). Simulation based strategy for nonlinear optimal control: Application to a microbial cell reactor. International Journal of Robust and Nonlinear Control: IFAC-Affiliated Journal, 13(3-4), 347-363.

Lee, J. H., & Lee, J. M. (2006). Approximate dynamic programming based approach to process control and scheduling. Computers & chemical engineering, 30(10-12), 1603-1618.

Lee, J. M., Kaisare, N. S., & Lee, J. H. (2006). Choice of approximator and design of penalty function for an approximate dynamic programming based control approach. Journal of process control, 16(2), 135-156.

Lee, J. M., & Lee, J. H. (2004). Simulation-based learning of cost-to-go for control of nonlinear processes. Korean Journal of Chemical Engineering, 21(2), 338-344.

Lee, J. M., & Lee, J. H. (2005). Approximate dynamic programming-based approaches for input-output data-driven control of nonlinear processes. Automatica, 41(7), 1281-1288.

Lillicrap, T. P., Hunt, J. J., Pritzel, A., Heess, N., Erez, T., Tassa, Y., & Wierstra, D. (2015). Continuous control with deep reinforcement learning. arXiv preprint arXiv:1509.02971.

Mu, C., Wang, D., & He, H. (2017). Novel iterative neural dynamic programming for data-based approximate optimal control design. Automatica, 81, 240-252.

Saeki, M. (2007). Properties of stabilizing PID gain set in parameter space. IEEE Transactions on Automatic Control, 52(9), 1710-1715.

Sedighizadeh, M., & Rezazadeh, A. (Feb. 2008). Adaptive PID controller based on reinforcement learning for wind turbine control. In Proceedings of world academy of science, engineering and technology (vol. 27, pp. 257-262).

Silver, D., Lever, G., Heess, N., Degris, T., Wierstra, D., & Riedmiller, M. (Jun. 2014). Deterministic policy gradient algorithms.

Skogestad, S. (Nov. 2001). Probably the best simple PID tuning rules in the world. In AIChE Annual Meeting, Reno, Nevada (vol. 77).

Spielberg, S., Tulsyan, A., Lawrence, N. P., Loewen, P. D., & Gopaluni, R. B. (2019). Towards Self-Driving Processes: A Deep Reinforcement Learning Approach to Control. AIChE Journal.

Stewart, G. E. (2012). A pragmatic approach to robust gain scheduling. IFAC Proceedings Volumes, 45(13), 355-362.

Sutton, R. S., & Barto, A. G. (2018). Reinforcement learning: An introduction. "Chapter 1: Introduction", pp. 1-4, MIT Press.

Sutton, R. S., McAllester, D. A., Singh, S. P., & Mansour, Y. (2000). Policy gradient methods for reinforcement learning with function approximation. In Advances in neural information processing systems (pp. 1057-1063).

Ziegler, J. G., & Nichols, N. B. (1942). Optimum settings for automatic controllers. trans. ASME, 64(11).

* cited by examiner

APPLICATION OF SIMPLE RANDOM SEARCH APPROACH FOR REINFORCEMENT LEARNING TO CONTROLLER TUNING PARAMETERS

TECHNICAL FIELD

Embodiments relate to industrial controllers implemented. Embodiments further relate to the field of machine learning including Reinforcement Learning (RL). Embodiments also relate to the field of Proportional Integral Derivative (PID) control and techniques for tuning PID controllers and other types of industrial controllers.

BACKGROUND

Reinforcement Learning (RL) is a branch of machine learning in which an objective is to learn an optimal strategy for interacting with an environment through experiences. This can involve learning an optimal policy through interactions with a stochastic environment modeled as a Markov Decision Process (MDP).

Only recently has RL been applied to the field of process control. Some approaches to RL-based control have involved using a fixed control strategy such as Proportional Integral Derivative (PID). A parallel form of a PID controller, which can be utilized is as follows:

$$C(s) = k_p + \frac{k_i}{s} + k_d s. \tag{1}$$

Although the structure of a PID controller may be simple, requiring only three parameters $k_p$, $k_i$, $k_d$, adjusting these parameters to meet certain performance specifications is difficult in practice.

Common performance measures of a closed-loop step response of a system can be expressed in terms of the integral error, such as Integral Absolute Error (IAE) or Integral Squared Error (ISE):

$$\text{IAE} = \int_0^\infty |e(t)| dt \tag{2}$$

$$\text{ISE} = \int_0^\infty e(t)^2 dt. \tag{3}$$

To appreciate the RL problem, it should be understood that for each state $s_t$ that the agent encounters, the agent can take some action $a_t$, leading to a new state $s_{t+1}$. Upon taking action $a_t$, the agent can receive a reward $r(s_t, a_t)$. The reward can measure how desirable a particular state-action interaction may, but to interact optimally with the environment the agent learns to maximize the expected reward following each state-action interaction.

Formally, the environment can be modeled by a Markov Decision Process (MDP) with an initial distribution $p(s_1)$ and transition probability $p(s_{t+1}|s_t, a_t)$. The agent can then transition from states to actions based on a conditional probability distribution $\pi$ referred to as a policy. If $h=(s_1, a_1, r_1, \ldots, s_T, a_T, r_T)$ is an arbitrary trajectory generated by the policy $\pi$ with sub-sequential states distributed according to p, we can write $h \sim p^\pi(\cdot)$. If we assume the policy has some parametric structure given by $\pi_\theta$, then the problem we aim to solve is:

$$\text{maximize } \mathbb{E}_{h \sim p^{\pi_\theta(\cdot)}}[R_t(h)|s_t, a_t]$$

over all $\theta \in \mathbb{R}^n$, \tag{4} where $R_T$ denotes the accumulated reward received over an arbitrary trajectory. Common approaches to solving the above-mentioned Equation (4) can involve Q-learning and the policy gradient theorem. In particular, variations of these methods involving function approximation have made RL problems tractable in continuous state and action spaces, whereas discretization may be otherwise necessary, leading to the so-called "curse of dimensionality". These methods and variations thereof have led to remarkable results in video games, the game of Go, and simulated continuous control such as locomotion tasks in MuJoCo (Multi-Joint dynamics with Contact), which his a tool for simulation of complex dynamics such as humanoid walking.

In contrast to the significant results described above, the issue of reproducibility has recently been examined in the RL community. For example, the performance of open-source implementations of popular policy gradient algorithms on various MuJoCo tasks has been considered and compared. Factors such as hyperparameters, neural network architecture, or random seeds can have a dramatic effect on algorithm performance. In light of these issues, several approaches have been recently proposed to implement new algorithms with competitive or superior performance in benchmark MuJoCo tasks compared to the state-of-the art performance reported with policy gradient methods.

Applications of Reinforcement Learning to process control are relatively recent. An early approach considered Approximate Dynamic Programming with function approximation as a computationally efficient framework for Model Predictive Control. More recently, the actor-critic method has been used for control on discrete-time nonlinear processes. In actor-critic approaches, the actor is a controller represented by a deep neural network. Other approaches to process control via Reinforcement Learning may use a PID controller instead of a deep neural network.

The tuning of PID controllers and other well-established industrial controllers, such as model predictive control, is a challenge across many industries. There are often many more PID controllers in a mill or plant, for example, than there are competent persons to tune them, and there may be no one in a mill or plant able to tune a model predictive controller. Therefore, having automated controller-tuning methods may improve process control and thus improve throughput, yield, or quality, while saving time and effort.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an improved method and system for tuning a controller.

It is another aspect of the disclosed embodiments to provide for tuning of a PID controller with reinforcement learning.

The aforementioned aspects and other objectives can now be achieved as described herein.

In an embodiment, a method for reinforcement learning can involve applying a finite-difference approach to a controller, and tuning the controller in response to applying the finite-difference approach by taking a state as an entirety of a closed-loop step response.

In an embodiment, the controller can comprise a PID (Proportional Integral Derivative) controller.

In an embodiment of the method, tuning the controller can further comprise comprises varying parameters of a policy, wherein the policy comprises a function from a step-response to new PID gains.

In an embodiment of the method, tuning the controller can further comprise changing a set point.

In an embodiment of the method, tuning the controller with respect to the entirety of the closed-loop step response can facilitate iteratively improving a gain toward a desired closed-loop response to allow for prescribing a stability requirement into a reward function without a modeling procedure.

In an embodiment of the method, the controller can be tuned under a condition of plant uncertainty.

In another embodiment, a system for reinforcement learning can include at least one processor, and a non-transitory computer-usable medium embodying computer program code, the computer-usable medium capable of communicating with the at least one processor, and the computer program code comprising instructions executable by the at least one processor and configured for: applying a finite-difference approach to a controller; and tuning the controller in response to applying the finite-difference approach by taking a state as an entirety of a closed-loop step response.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Note that as utilized herein the term plant can relate to a "plant" in the context of control theory. A plant in this context can be the combination of process and an actuator and may also be considered as a transfer function indicating the relationship between and an input signal and the output signal of a system without feedback, commonly determined by physical properties of the system. An example may be an actuator with its transfer of the input of the actuator to its physical displacement. In a system with feedback, the plant still may have the same transfer function, but a control unit and a feedback loop (with their respective transfer functions) may be added to the system.

Figure 1:
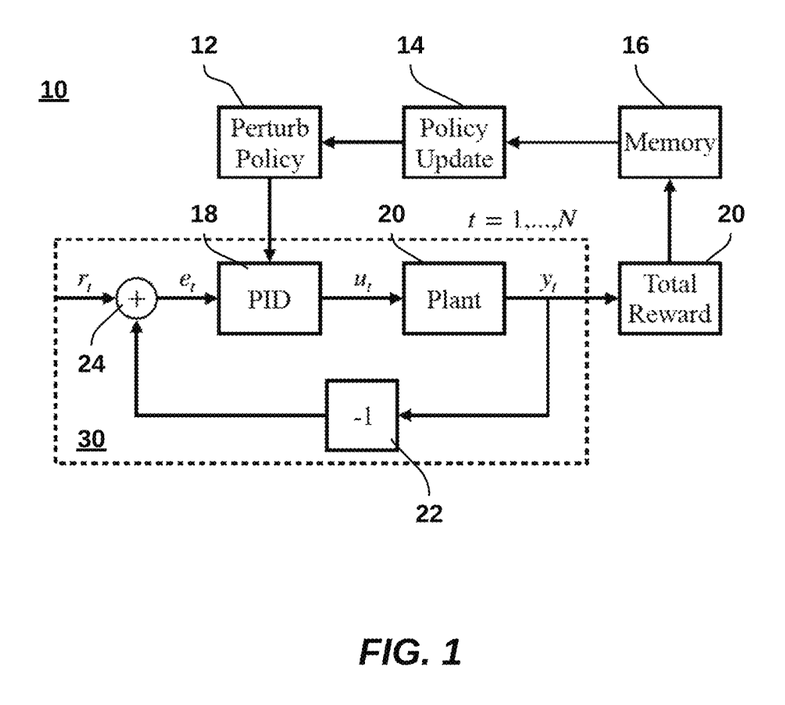
FIG. 1 illustrates a block diagram of a system that includes a closed loop structure, in accordance with an embodiment.

FIG. 1 illustrates a block diagram of a system 10 that includes a closed loop structure 30, in accordance with an embodiment. The closed loop structure 30 is shown inside a dashed box in FIG. 1. Arrows entering or leaving the dashed box indicate the passing of N time steps. Outside the dashed box, we can store cumulative rewards in a memory 16 based on slightly perturbed policies, which can be used to update the policy with a finite difference scheme as discussed in greater detail herein.

The closed loop structure 30 includes a summation unit 24 that supplies output to a PID 18, which in turn outputs a signal that can be fed to a plant 20. Output from the plant 20 is fed to a block 20 representative of the "total reward" and also to a block 22 (negative value) that in turn outputs a signal that is fed as input to the summation unit 24. The output from block 20 can be then fed as input to the memory 16, which in turn supplies an output signal that is fed as input to a block 14 that processes a policy update. The output from block 14 is then supplied as input to a block 12 ("perturb policy").

The disclosed approach involves defining the actions of an RL agent to be a vector of PID gains, and also defining the state to be a discretization of the closed-loop step-response under these PID gains, and the resulting reward to be the mean absolute (or squared) error between the step-response and the target transfer function. The parameter s can be used to refer to the RL state, y(t) for the value of the closed-loop step-response at the particular time t, and $\bar{y}(t)$ to refer to the desired closed-loop output at time t. Performance can be then compared over a finite time horizon [0, T], which can lead the following expression for our reward function:

$$r(s) = \frac{1}{T}\int_0^T (|y(t) - \bar{y}(t)|)^p dt, \quad (5)$$

An important aspect of this approach is that the user can specify the target data $\bar{y}$, meaning that the reward function can incorporate user-defined stability requirements. Note that the parameter p=1 or 2 can be fixed. In a simulation, the state s in Equation (5) can be evaluated using a finite number of output samples, followed by rewriting Equation (5) as an average of absolute or squared errors over a fixed number of output samples of the current closed-loop response compared to the target response. Thus, we can vary the parameters of a policy, which can be a function from a step-response to new PIC gains. The varying policies can be used to generate new PID gains.

We now turn our attention to Algorithm 1, which is shown further below. For Algorithm 1 we can introduce the following notation. We can refer to the process being controlled as P, and denote the vector of PID gains by $K:=[k_p, k_i, k_d]$, and let $T=[0, t_1, \ldots, t_{n-1}]$ be a vector of n sampling times. In addition, the feedback (P, K) refers to the negative feedback loop for plant P under the PID controller with gains K. Finally, step(H, T) can refer to the vector of outputs at each time step in T for some system H.

In Algorithm 1, if we set $K_0$ to a zero vector then the first iteration simply operates with a zero-mean Gaussian matrix for the policy at line 10. Alternatively, if a set of PID gains can be known to be stabilizing, or obtained though methods such as Relay tuning, then we can initialize the algorithm so as to improve these gains (subject to the reward objective) through evaluating the performance of small perturbations to the policy. Note that in line 10 of Algorithm 1 below, the vector with $K_0$ remain fixed throughout training.

At the beginning of each episode, we can sample several p×n matrices $\delta_j$ with independent random normal entries, each used to generate a slightly perturbed policy matrix $M+\sigma\delta_j$. After the rewards are collected for these perturbed policies, in lines 16 and 17 we can update the policy using a scaled average of the finite-difference approximation for the gradient given by $[r^*-r^-]\delta$. We can scale by a fixed-step size $\alpha>0$ as well as the reciprocal of the standard deviation of the rewards obtained from each sampled direction $\delta$. Together these scaling factors can provide smaller update steps when the current policy is more sensitive to perturbations, while larges steps can be permitted when the perturbed policies yield similar rewards. Finally, the optional hyperparameter $\beta$ can be a momentum term.

---

Algorithm 1 Close-Loop Transfer Function Tracking Algorithm

1: Output: Optimal PID gains K
2: Hyperparameters: stepsize $\alpha > 0$, momentum term $\beta \in [0, 1)$, standard deviation $\sigma > 0$ for policy exploration, number of sampling directions N, sampling times T
3: Initialize: PID gains $K_0$, policy $M \in \mathbb{R}^{p \times n}$, $\upsilon = 0_{p \times n}$
4: Set $K = K_0$
5: for each episode do
6:     x ← step(feedback(P, K), T)
7:     s ← x − $\tilde{x}$
8:     for each j in 1, . . . , N do
9:         Sample $\delta_j \in \mathbb{R}^{p \times n}$ with independent standard normal entries
10:         Perturb policy and evaluate performance of new PID gains:

$$\begin{cases} K^+ \leftarrow (M + \sigma\delta_j)x + K_0 \\ K^- \leftarrow (M - \sigma\delta_j)x + K_0 \end{cases}$$

11:         Collect output samples of closed-loop step response under new PID gains:

$$\begin{cases} x_j^+ \leftarrow \text{step(feedback}(P, K^+), T) \\ x_j^- \leftarrow \text{step(feedback}(P, K^-), T) \end{cases}$$

12:         Evaluate deviations from target data:

$$\begin{cases} s_j^+ \leftarrow x_j^+ - \tilde{x} \\ s_j^- \leftarrow x_j^- - \tilde{x} \end{cases}$$

13:         Evaluate rewards:

$$\begin{cases} r_j^+ \leftarrow \text{Reward at } s_j^+ \\ r_j^- \leftarrow \text{Reward at } s_j^- \end{cases}$$

14:     end for
15:     Evaluate standard deviation $\sigma_r$ of the 2N rewards
16:

$$\upsilon \leftarrow \beta\upsilon + \frac{(1-\beta)\alpha}{\sigma_r}\frac{1}{N}\sum_{j=1}^{N}[r_j^+ - r_j^-]\delta_j$$

17:     M ← M + $\upsilon$
18:     K ← Mx + $K_0$
19:     x ← step(feedback(P, K), T)
20: end for

---

In an experimental embodiment, Algorithm 1 was scripted in MATLAB and the process simulated using the Control System Toolbox. The same parameters were used in the following examples: $\alpha=0.005$, $\beta=0.90$, $\sigma=0.005$, N=10, with samples taken in increments of 0.30 seconds. It should be appreciated that such values and parameters are not to be considered limitations of the disclosed embodiments but are provided herein for exemplary purposes only.

Example 1

In this example, we demonstrate our tuning method by constructing a desired closed-loop transfer function around a given plant model and set of target PID parameters. Consider the following continuous-time transfer function:

$$G(s) = \frac{1}{(s+1)^3}. \quad (6)$$

We can randomly initialize $k_p$, $k_i$, $k_d \in [0, 0.2]$ and set the desired parameters to be $k_p=2.5$; $k_i=1.5$; $k_d=1.0$. The target data can then comes from uniform samples of the step-response from the closed-loop transfer function CG/(1+CG) where C is the PID controller with the aforementioned target parameters (see the end of the example for the hyperparameters used in Algorithm 1).

We can highlight several important notes about this experiment. First, the speed at which the algorithm finds the correct parameters can be determined by the step-size α, the exploration parameter σ, and the relative distance between initial and optimal gains. We can initialize the gains far away from the target to illustrate the trajectories of the gains during the learning procedure (e.g., see FIG. 3). Second, our algorithm does not use any knowledge about the plant dynamics nor does it utilize a modeling procedure. Further, the PID control structure can be only implicitly used, meaning the actions K directly influence the closed-loop, but can correspond to any controller with a parametric structure. Finally, the target step-response can be user-specified, which can render Algorithm 1 amendable to performance specifications. Example 1 can be illustrated by reference to FIG. 2, FIG. 3, and FIG. 4.

Figure 2:
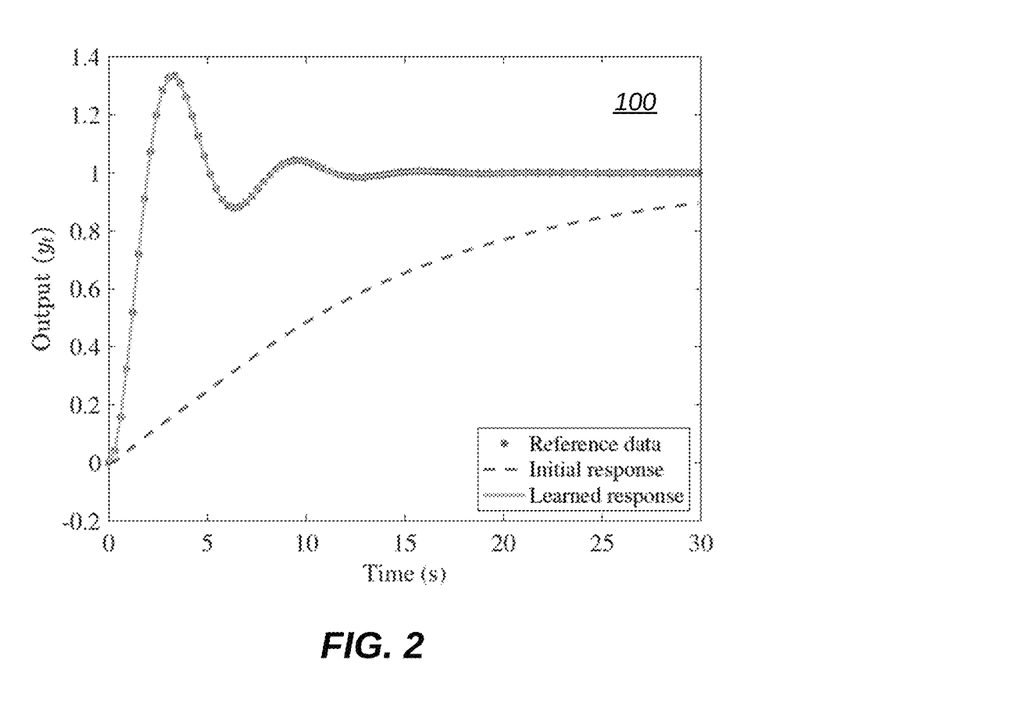
FIG. 2 illustrates a graph of output versus time with reference data, an initial response, and a learned response, in accordance with an embodiment.

FIG. 2 illustrates a graph 100 of output versus time with reference data, an initial response, and a learned response, in accordance with an embodiment. In graph 100, the close-loop step response as the beginning is shown with a dashed line, and at end of training shown with a solid line, along with the reference data.

Figure 3:
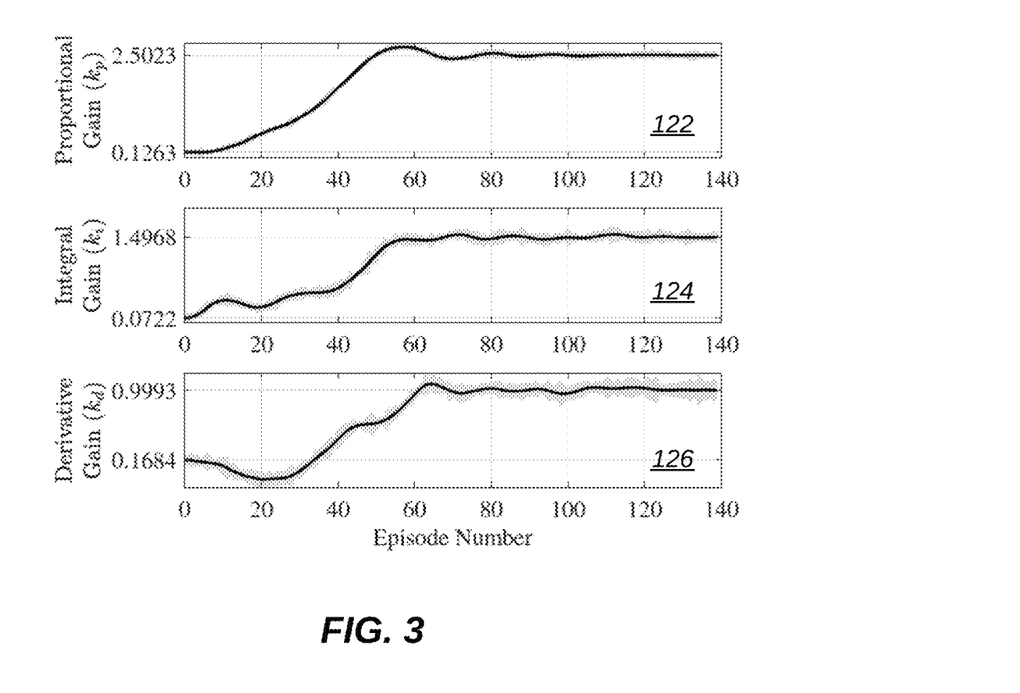
FIG. 3 illustrates graphs of gain versus episode number, in accordance with an embodiment.

FIG. 3 illustrates graphs 122, 124, and 126 of gain versus episode number, in accordance with an embodiment. In FIG. 3, the value of the updated PID gains at each iteration is shown in black. The highlighted region shows the range of values at each episode in line 10 of Algorithm 1.

Figure 4:
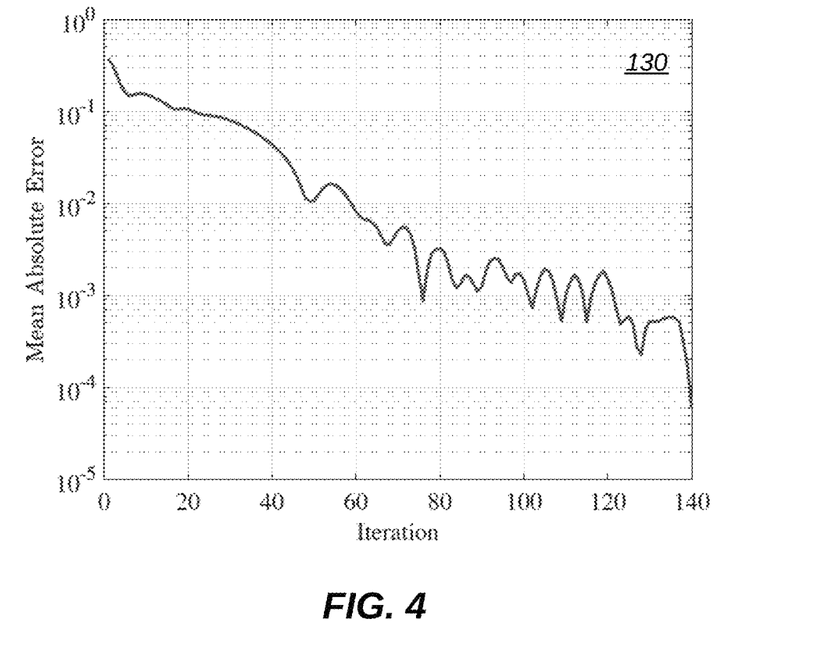
FIG. 4 illustrates a graph of mean absolute error versus episode number, in accordance with an embodiment.

FIG. 4 illustrates a graph 130 of mean absolute error versus episode number, in accordance with an embodiment. Graph 130 in FIG. 4 indicates that the mean absolute error decreases on a logarithmic scale with the number of episodes.

Example 2

In this example, we can consider input delay in our plant, i.e., Equation (6), and can now define the following:

$$G(s) = \frac{e^{-4s}}{(s+1)^3}. \quad (7)$$

We can then set the following as our target closed-loop transfer function.

$$H(s) = \frac{e^{-5s}}{4s+1}. \quad (8)$$

In this example, we consider a mismatch in the time delay of our plant in Equation (7) and target in Equation (8). Because of this we are unable to find PID parameters such that the closed-loop response matches the target exactly. However, using the same hyper-parameters from example 1, our algorithm still finds PID gains that lead to a small mean absolute error. Example 2 above can be illustrated by reference to FIG. 5, FIG. 6, and FIG. 7.

Figure 5:
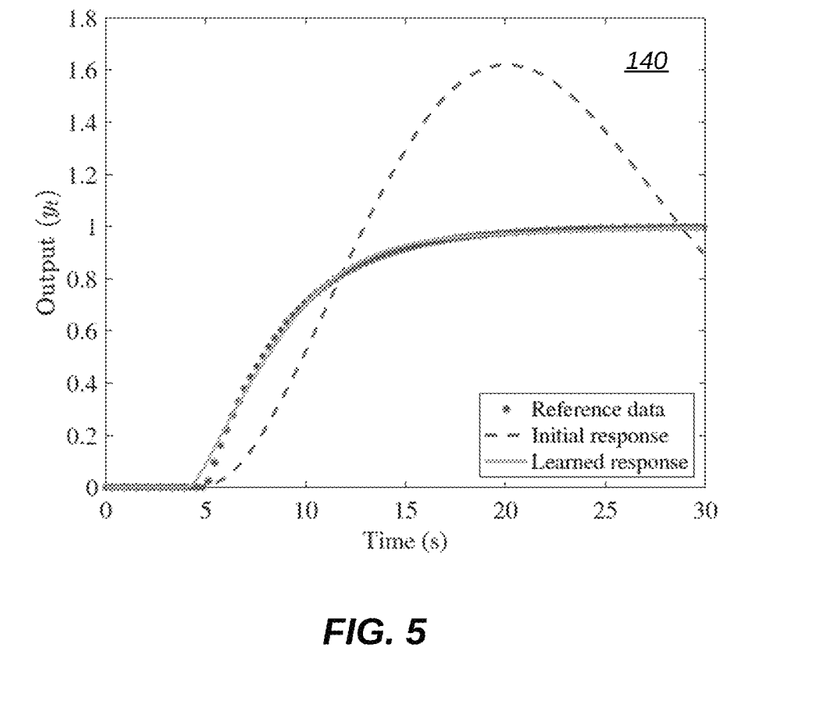
FIG. 5 illustrates a graph of output versus time with reference data, an initial response, and a learned response, in accordance with an embodiment.

FIG. 5 illustrates a graph 140 of output versus time with reference data, an initial response, and a learned response, in accordance with an embodiment. Graph 140 of FIG. 5 indicates that the final response closely matches the desired response despite a mismatch in the time-delay.

Figure 6:
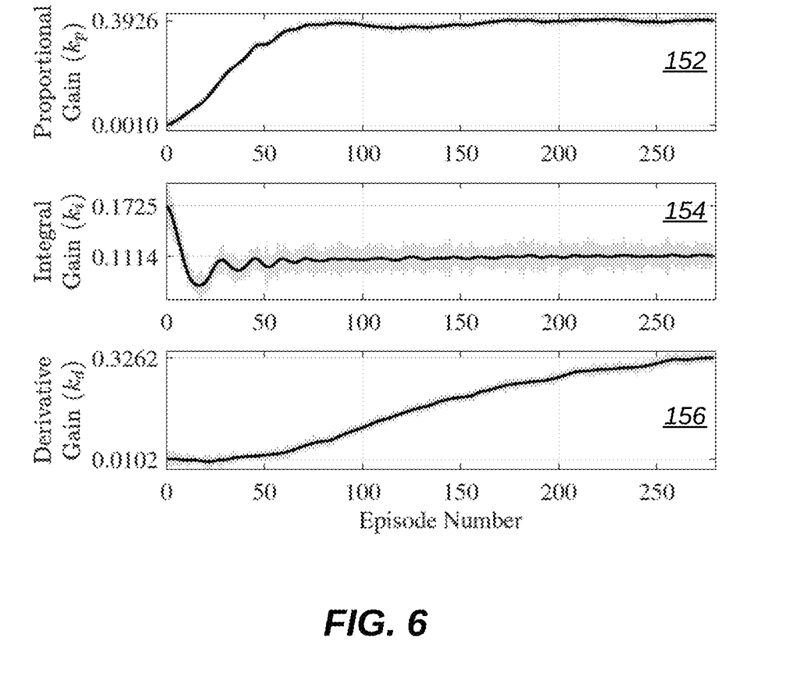
FIG. 6 illustrates graphs of gain versus episode number, in accordance with an embodiment.

FIG. 6 illustrates graphs 152, 154, 156 of gain versus episode number, in accordance with an embodiment. In FIG. 6, the value of the updated PID gains at each iteration is shown in black. The highlighted region shows the range of values at each episode in line 10 of Algorithm 1.

Figure 7:
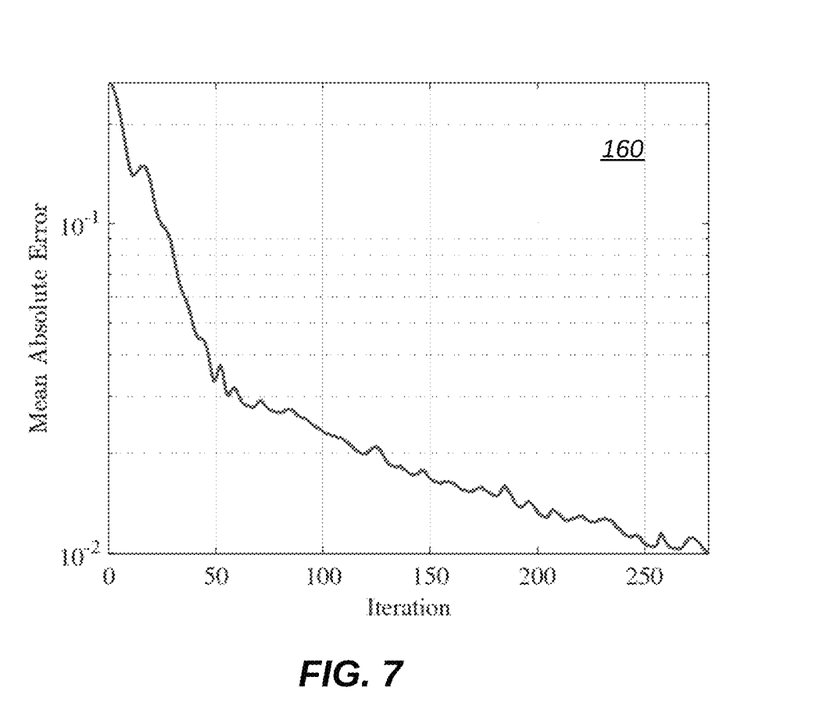
FIG. 7 illustrates a graph of mean absolute error versus episode number, in accordance with an embodiment.

FIG. 7 illustrates a graph 160 of mean absolute error versus episode number, in accordance with an embodiment. Graph 160 in FIG. 7 indicates that the mean absolute error decreases on a logarithmic scale with the number of episodes.

Example 3

In this example, we can tune a PID controller using Algorithm 1 under plant uncertainty. Consider a nominal plant given by $$G(s) = \frac{-0.02}{s+1} e^{-s}.$$

Our environment can be modeled by G with, for example, a 20% uncertainty in the gain as shown in Equation (9) below:

$$P := \{G(8)\Delta : 0.8 \leq \Delta \leq 1.2\}. \quad (9)$$

We can generate our target closed-loop data with G under the PID gains obtained with an SIMC tuning method. In algorithm 1, at the beginning of each episode we can sample some $G_i \in P$ by uniformly sampling $\Delta$.

We may also not be able the target data exactly because we may be optimizing the PID gains over a collection of plants. However, after running Algorithm 1, we can also find PID gains that closely match the desired closed-loop response across all plants in the collection (see Equation (9)). Again, Example 3 can be illustrated by referring to FIG. 8, FIG. 9, and FIG. 10.

Figure 8:
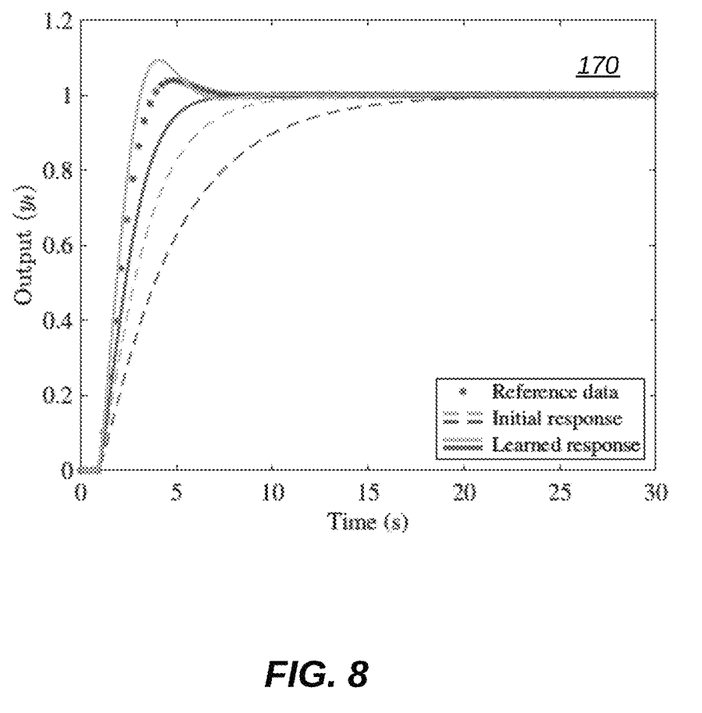
FIG. 8 illustrates a graph of output versus time with reference data, an initial response, and a learned response, in accordance with an embodiment.

FIG. 8 illustrates a graph 170 of output versus time with reference data, an initial response, and a learned response, in accordance with an embodiment. In graph 170 of FIG. 8, lines show the initial and final (dashed and solid, respectively) responses with $\Delta=1.2$ in (see Equation (9)). Similarly, lines are shown that correspond to $\Delta=0.8$.

Figure 9:
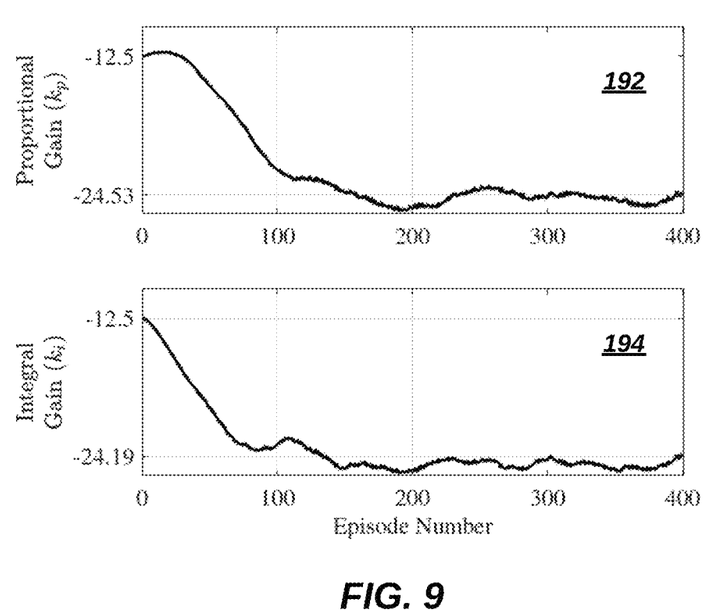
FIG. 9 illustrates graphs of updated integral and proportional gains at each episode, in accordance with an embodiment.

FIG. 9 illustrates graphs 192, 194 of updated integral and proportional gains at each episode, in accordance with an embodiment. In FIG. 9, the updated integral and proportional gains are shown at each episode, where each episode corresponds to some $G_i \in P$.

Figure 10:
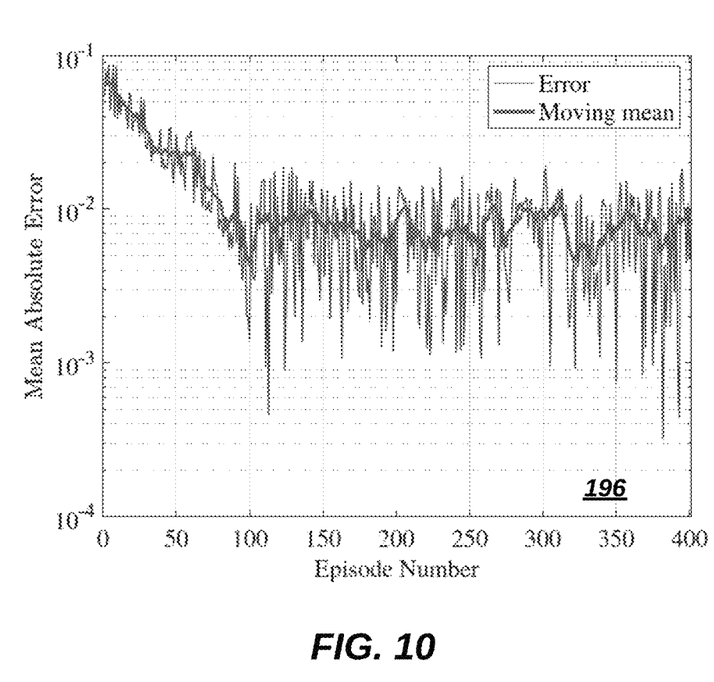
FIG. 10 illustrates a graph of mean absolute error versus episode number, in accordance with an embodiment.

FIG. 10 illustrates a graph 196 of mean absolute error versus episode number, in accordance with an embodiment. In graph 196, the mean absolute error at each episode is shown along with a curve overlapping it to show the moving average across 10 episodes.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a bidirectional data communications network such as a local area network (LAN) or a wide area network (WAN), a wireless local area network (WLAN), wireless data network e.g., Wi-Fi, Wimax, 802.xx, and/or a cellular network or the bidirectional connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block or feature of the illustrations, and combinations of blocks or features, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks or elsewhere herein. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
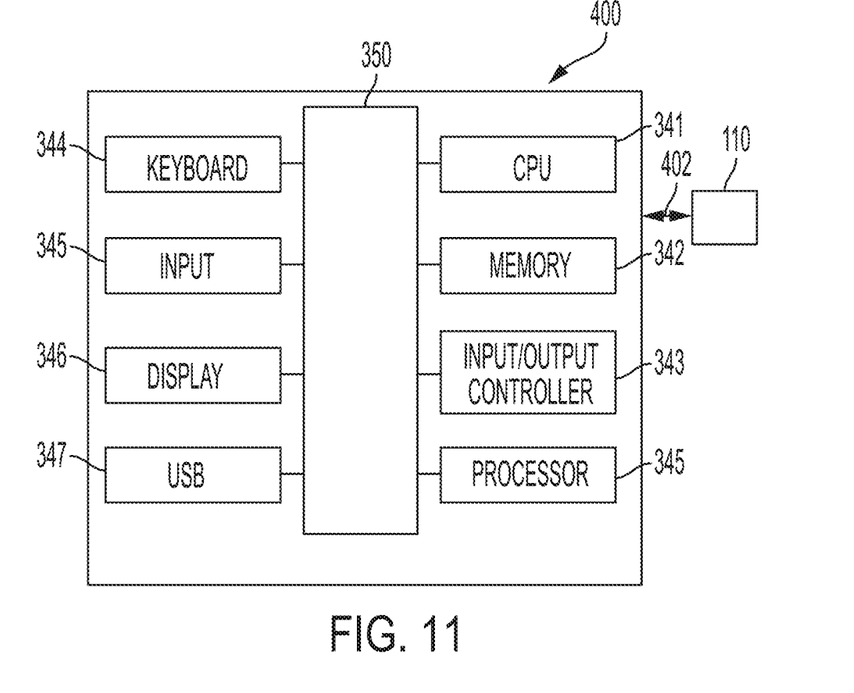
FIG. 11 illustrates a schematic view of a data-processing system, in accordance with an embodiment.
Figure 12:
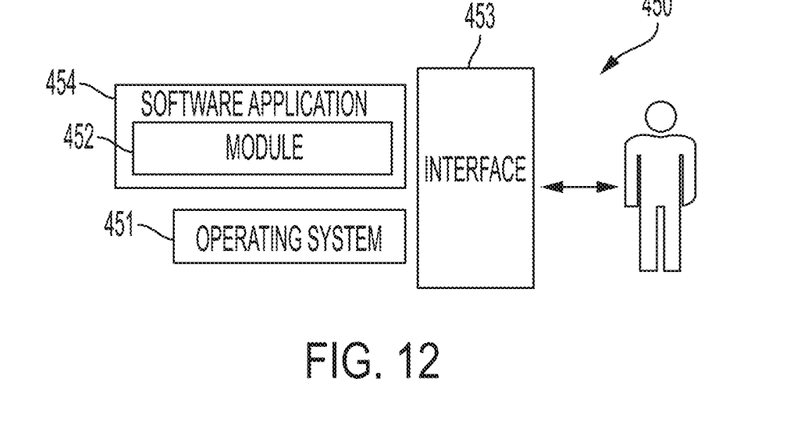
FIG. 12 illustrates a schematic view of a software system including a module, an operating system, and a user interface, in accordance with an embodiment.

FIGS. 11-12 are shown only as exemplary diagrams of data-processing environments in which example embodiments may be implemented. It should be appreciated that FIGS. 11-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 11, some embodiments may be implemented in the context of a data-processing system 400 that can include, for example, one or more processors such as a CPU (Central Processing Unit) 341 and/or other another processor 349 (e.g., microprocessor, microcontroller etc), a memory 342, an input/output controller 343, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a smartphone, a tablet computing device, a networked computer server, and so on, wherein each such device can be operably connected to and/or in communication with a client-server based network or other types of networks (e.g., cellular networks, Wi-Fi, etc). The data-processing system 400 can communicate with other devices such as, for example, an electronic device 110. Communication between the data-processing system 400 and the electronic device 110 can be bidirectional, as indicated by the double arrow 402. Such bidirectional communications may be facilitated by, for example, a computer network, including wireless bidirectional data communications networks.

FIG. 12 illustrates a computer software system 450 for directing the operation of the data-processing system 400 depicted in FIG. 11. Software application 454, stored for example in the memory 342 can include one or more modules such as module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions, steps or operations such as those discussed herein. Module 452 may also be composed of a group of modules and/or sub-modules, which may implement instructions such as the various steps and operations set forth herein with respect to Algorithm 1.

The following discussion is intended to provide a brief, general description of suitable computing environments in which the system and method may be implemented. The disclosed embodiments can be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that can perform particular tasks or which can implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be private (e.g., accessible only to that module) and which can include source code that actually implements the routines in the module. The term module can also relate to an application, such as a computer program designed to assist in the performance of a specific task, such as implementing the operations associated with the example Algorithm 1 previously discussed herein.

It can be appreciated that the technical solutions described herein are rooted in computer technology, particularly using reinforced learning frameworks. Further, the technical solutions described herein are also related to closed loop control systems. The technical solutions described herein can improve such computer technology by providing the one or more advantages described throughout the present disclosure by improving the performance of an incremental control system and devices such as a controller (e.g., a PID controller).

Further, the technical solutions described herein can facilitate a control system (e.g., a controller) by using a machine learning approach called reinforcement learning to experiment on a process and find optimal controller (for example PID) tuning parameters. The technical solutions offered by the disclosed embodiments accordingly facilitate improvements in the control system (e.g., a controller) including improving its efficiencies through the application of a finite-difference approach to the problem of controller tuning, and taking the 'state' (in the language of reinforcement learning) to be the entirety of a closed-loop step response rather than simply the error. Such a technical solution can result in automated PID and/or model predictive control tuning and improve the efficiencies of the disclosed controller under various conditions.

The tuning of PID controller and other well-established industrial controllers, such as model predictive control, is a challenge across many industries. There are often many more PID controllers in a mill or plant than there are competent persons to tune them, and there may be no one in a mill or plant able to tune a model predictive controller. Therefore implementing automated controller tuning methods can improve process control and thus improve throughput, yield, or quality, while saving time and effort.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for reinforcement learning to automate tuning of a controller to control a process in an industrial plant, comprising:
   supplying, by a summation unit, an output of a controller to an industrial plant in a closed loop structure;
   processing a policy update by feeding an output of the industrial plant to a total reward through a memory of the closed loop structure;
   providing a perturb policy based on an output of the policy update;
   varying parameters of the policy update to provide a finite-difference approach to tune the controller from a closed-loop step-response using the closed loop structure;
   applying the finite-difference approach to tune the controller; and
   tuning the controller in response to applying the finite-difference approach by taking a state as an entirety of the closed-loop step response.

2. The method of claim 1 wherein the controller comprises a PID (Proportional Integral Derivative) controller.

3. The method of claim 2 wherein the policy comprises a function from a step-response to new PID gains.

4. The method of claim 2 wherein tuning the controller further comprises changing a set point.

5. The method of claim 2 wherein tuning the controller further comprises:
   varying parameters of a policy, wherein the policy comprises a function from a step-response to new PID gains; and
   changing a set point.

6. The method of claim 1 wherein tuning the controller with respect to the entirety of the closed-loop step response facilitates iteratively improving a gain toward a desired closed-loop response to allow for prescribing a stability requirement into a reward function without a modeling procedure.

7. The method of claim 1 wherein the controller is tuned under a condition of plant uncertainty.

8. A system for reinforcement learning to automate tuning of a controller to control a process in an industrial plant, comprising:
 at least one processor; and
 a non-transitory computer-usable medium embodying computer program code, said computer-usable medium capable of communicating with said at least one processor, said computer program code comprising instructions executable by said at least one processor and configured for:
  supplying, by a summation unit, output of a controller to a plant in a closed loop structure;
  processing a policy update by feeding an output of the plant to a total reward through a memory of the closed loop structure;
  providing a perturb policy based on the output of the policy update;
  varying parameters of the policy update to provide a finite-difference approach to tune the controller from a closed-loop step-response using the closed loop structure;
  applying the finite-difference approach to tune the controller; and
  tuning the controller in response to applying the finite-difference approach by taking a state as an entirety of the closed-loop step response.

9. The system of claim 8 wherein the controller comprises a PID (Proportional Integral Derivative) controller.

10. The system of claim 9 wherein the policy comprises a function from a step-response to new PID gains.

11. The system of claim 9 wherein the instructions for tuning the controller further comprises instructions configured for changing a set point.

12. The system of claim 9 wherein the instructions for tuning the controller further comprise instructions configured for:
 varying parameters of a policy, wherein the policy comprises a function from a step-response to new PID gains; and
 changing a set point.

13. The system of claim 8 wherein the instructions for tuning the controller with respect to the entirety of the closed-loop step response facilitates iteratively improving a gain toward a desired closed-loop response to allow for prescribing a stability requirement into a reward function without a modeling procedure.

14. The system of claim 8 wherein the controller is tuned under a condition of plant uncertainty.

15. An apparatus for reinforcement learning to automate tuning of a controller to control a process in an industrial plant, comprising:
 at least one processing device configured to:
  supply, by a summation unit, an output of a controller to an industrial plant in a closed loop structure
  process a policy update by feeding an output of the industrial plant to a total reward through a memory of the closed loop structure;
  provide perturb policy based on an output of the policy update; and
  vary parameters of the policy update to provide a finite-difference approach to tune the controller from a closed-loop step-response using the closed loop structure,
 wherein the finite-difference approach is applied to tuning the controller and the controller is tuned in response to applying the finite-difference approach by taking a state as an entirety of the closed-loop step response.

16. The apparatus of claim 15 wherein the controller comprises a PID (Proportional Integral Derivative) controller.

17. The apparatus of claim 16 wherein the policy comprises a function from a step-response to new PID gains.

18. The apparatus of claim 16 wherein the controller is tuned by changing a set point.

19. The apparatus of claim 16 wherein the controller is tuned by:
 varying parameters of a policy, wherein the policy comprises a function from a step-response to new PID gains; and
 changing a set point.

20. The apparatus of claim 15 wherein tuning the controller with respect to the entirety of the closed-loop step response facilitates iteratively improving a gain toward a desired closed-loop response to allow for prescribing a stability requirement into a reward function without a modeling procedure.

* * * * *